United States Patent Office 3,234,235
Patented Feb. 8, 1966

3,234,235
HETEROCYCLIC CARBINOLS
Martin A. Davis and Stanley O. Winthrop, Montreal, Quebec, Canada, assignors to American Home Products Corporation, New York, N.Y., a corporation of Delaware
No Drawing. Filed Jan. 19, 1962, Ser. No. 167,408
4 Claims. (Cl. 260—327)

This invention relates to certain new chemical compounds, novel heterocyclic carbinols, which may be generically represented by the following formula:

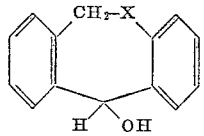

wherein X is selected from the group consisting of O, S, and $SO_2$. It is also concerned with the process by which these new compounds may be prepared from available starting materials.

More specifically, our invention is directed to 11-hydroxylated derivatives of 5,6-dihydrodibenzo [b,e]-oxepine, 5,6-dihydrodibenzo [b,e]thiepine, and of its corresponding thiepine-5,5-dioxide. These new chemical compounds are useful as anti-convulsants, especially against convulsions caused by electroshock. They are also distinguished by a low order of toxicity.

The new chemical compounds may be readily prepared from the corresponding ketones by reduction thereof. Among suitable reducing agents are sodium borohydride and lithium aluminum hydride. The reaction occurring may be represented as follows:

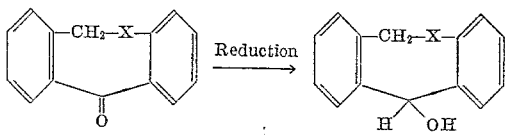

wherein X is selected from the group consisting of oxygen, sulfur and $SO_2$.

Specifically, 11 - hydroxy - 5,6 - dihydrodibenzo [b,e]-oxepine may be readily prepared by reduction of 11-keto-5,6-dihydrodibenzo [b,e]oxepine. In a similar manner 11-hydroxy-5,6-dihydrodibenzo [b,e]thiepine may be prepared by reduction of 11-keto-5,6-dihydrodibenzo [b,e]-thiepine. Further, 11 - hydroxy - 5,6 - dihydrodibenzo [b,e]thiepine-5,5-dioxide may be readily prepared by reducing 11-keto-5,6-dihydrodibenzo [b,e]thiepine-5,5-dioxide.

The starting materials: 11-Keto-5,6-dihydrodibenzo [b,e]oxepine; 11 - keto - 5,6 - dihydrodibenzo [b,e]thiepine; and 11-keto-5,6-dihydrodibenzo [b,e]thiepine-5,5-dioxide may be prepared as described below.

11-keto-5,6-dihydrodibenzo [b,e]oxepine may be readily prepared by heating ortho-carboxybenzyl phenyl ether, in benzene as a diluent, with phosphorus pentoxide. Heating at reflux for five hours will give a good yield of product. A small amount of diatomaceous earth as a decolorizing agent may advantageously be present. Upon filtration of the reaction mixture, followed by evaporation down in vacuo, i.e., at a reduced pressure less than atmospheric, to remove the benzene, the desired product is left behind and may be subjected to purification by conventional procedures.

11-keto-5,6-dihydrodibenzo [b,e]thiepine may be prepared in a similar manner by heating ortho-carboxybenzyl phenyl thioether at reflux with phosphorus pentoxide. Xylene is preferably utilized as the inert solvent or diluent, and the product is recovered, as before, by evaporation down of the reaction mixture. Ordinarily the product is recovered as an oil which, however, crystallizes when triturated with a small amount of hexane.

11 - keto - 5,6 - dihydrodibenzo [b,e]thiepine - 5,5-dioxide is readily prepared by oxidation of 11-keto-5,6-dihydrodibenzo [b,e]thiepine. Hydrogen peroxide in glacial acetic acid is a convenient oxidizing agent. The reaction is best carried out at a relatively low temperature, 4° C. or thereabouts. Allowing the reaction mixture to warm up to room temperature and stand for seventy-two hours results in precipitation of the 5,5-dioxide.

These starting materials are subjected to reduction, as stated above, utilizing, preferably, sodium borohydride or lithium aluminum hydride as the reducing agents. Lithium aluminum hydride is the preferred reducing agent since its use results in a product which is easier to purify. Further details of our process, and of the novel products resulting therefrom, will be found in the illustrative examples which follow.

Example 1

A solution of 11-keto-5,6-dihydrodibenzo [b,e]oxepine (3.55 g., 0.017 mole) in dry ether (75 ml.) was added dropwise to a well stirred suspension of lithium aluminum hydride (1.90 g., 0.050 mole) in ether (60 ml.). After the addition was completed the reaction mixture was heated under reflux for three hours, chilled and hydrolyzed by the successive addition of water (1.9 ml.), 20% aqueous sodium hydroxide (1.4 ml.), and water (6.7 ml.). The precipitate was filtered off, washed well with ether, and the combined filtrates were dried and evaporated. Recrystallization of the residue from hexane gave 2.5 g. (70% yield) of 11-hydroxy-5,6-dihydrodibenzo [b,e]-oxepine as white needles, M.P. 88–89° C.

Analysis confirmed the empiric formula $C_{14}H_{12}O_2$, required: C, 79.22%; H, 5.70%. Found: C, 79.41%; H, 5.85%.

Example 2

A solution of 11-keto-5,6-dihydrodibenzo [b,e]thiepine (7.8 g., 0.034 mole) in dry ether (150 ml.) was added dropwise to a stirred suspension of lithium aluminum hydride (4.2 g., 0.11 mole) in ether (150 ml.). The reaction mixture was heated under reflux for four hours, chilled and decomposed in a manner analogous to the one described in the previous example. Recrystallization of the product from ethyl acetatehexane mixture gave 6.0 g. (77% yield) of 11-hydroxy-5,6-dihydrodibenzo [b,e]thiepine, M.P. 108–109° C.

Analysis confirmed the empiric formula $C_{14}H_{12}OS$, required: C, 73.67%; H, 5.30%; S, 14.02%. Found: C, 72.95%; H, 5.11%; S, 14.00%.

Example 3

A solution of sodium borohydride (2.9 g., 0.08 mole) in water (15 ml.) containing 10% aqueous sodium hydroxide (0.5 ml.) was added dropwise to a stirred suspension of 11 - keto - 5,6 - dihydrodibenzo[b,e]thiepine-5,5-dioxide (5.0 g., 0.02 mole) in methanol (300 ml). An exothermic reaction ensued followed by complete dissolution of the starting material. The reaction mixture was stirred at room temperature for six hours whereupon the bulk of the methanol was evaporated in vacuo. The residue was added to water (100 ml.) and the mixture was neutralized by the addition of acetic acid. The precipitate was collected, dried and recrystallized repeatedly from ethyl acetate or isopropanol to furnish a sample M.P., 157° C., consisting of 11-hydroxy-5,6-dihydrodibenzo [b,e]thiepine-5,5-dioxide. There was obtained 1.8 g. of purified product (36% yield).

Analysis confirmed the empiric formula $C_{14}H_{12}O_3S$, required: C, 64.61%; H, 4.65%; S, 12.30%. Found: C, 64.71% H; 4.84%; S, 12.37%.

We claim:
1. A compound having the structural formula

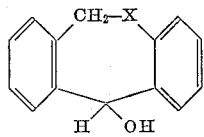

wherein X is selected from the group which consists of O, S and $SO_2$.
2. 11-hydroxy-5,6-dihydrodibenzo [b,e]oxepine.
3. 11-hydroxy-5,6-dihydrodibenzo [b,e]thiepine.
4. 11 - hydroxy - 5,6 - dihydrodibenzo [b,e]thiepine-5,5-dioxide.

References Cited by the Examiner
UNITED STATES PATENTS
2,951,082  8/1960  Sprague et al. _____ 260—328

WALTER A. MODANCE, *Primary Examiner.*
IRVING MARCUS, DUVAL T. McCUTCHEN,
*Examiners.*